United States Patent [19]

Bjorklund et al.

[11] Patent Number: 5,361,148
[45] Date of Patent: Nov. 1, 1994

[54] APPARATUS FOR PHOTOREFRACTIVE TWO BEAM COUPLING

[75] Inventors: Gary C. Bjorklund, Los Altos; Donald M. Burland, San Jose, both of Calif.; Marcus C. J. M. Donckers, ES Leiden, Netherlands; Robert D. Miller; William E. Moerner, both of San Jose, Calif.; Scott M. Silence, Fremont, Calif.; Robert J. Twieg; Cecilia A. Walsh, both of San Jose, Calif.

[73] Assignee: International Business Machines Corporation, Armonk, N.Y.

[21] Appl. No.: 6,450

[22] Filed: Jan. 21, 1993

[51] Int. Cl.$^5$ .............................................. G03H 1/02
[52] U.S. Cl. ............................................ 359/4; 359/3; 359/7; 359/34; 385/5; 385/122
[58] Field of Search ................. 359/3, 4, 7, 34; 385/5, 385/122

[56] References Cited

U.S. PATENT DOCUMENTS

| | | | |
|---|---|---|---|
| 3,839,034 | 10/1974 | Wiedemann | 96/1.5 |
| 4,284,698 | 8/1981 | Kazami et al. | 430/59 |
| 4,358,519 | 11/1982 | Chang et al. | 430/2 |
| 4,385,106 | 5/1983 | Sakai | 430/59 |
| 4,405,218 | 9/1983 | Wirth | 352/108 |
| 4,489,148 | 12/1984 | Horgan | 430/59 |
| 4,578,334 | 3/1986 | Borsenberger et al. | 430/59 |
| 4,606,988 | 8/1986 | Sasaki | 430/59 |
| 4,714,666 | 12/1987 | Wiedemann et al. | 430/59 |
| 4,769,302 | 9/1988 | Ueda | 430/59 |
| 4,909,598 | 3/1990 | Ninomiya et al. | 359/328 |
| 4,997,595 | 3/1991 | Kurihara et al. | 252/587 |
| 4,999,809 | 3/1991 | Schidkraut et al. | 365/106 |
| 5,004,325 | 4/1991 | Glass et al. | 350/354 |
| 5,028,109 | 7/1991 | Lawandy | 359/328 |
| 5,061,028 | 10/1991 | Khanarian et al. | 385/132 |
| 5,064,264 | 11/1991 | Ducharme et al. | 385/130 |
| 5,077,163 | 12/1991 | Hayata et al. | 430/59 |
| 5,161,039 | 11/1992 | Schellenberg | 359/3 |

FOREIGN PATENT DOCUMENTS

| | | | |
|---|---|---|---|
| 0469941 | 7/1991 | European Pat. Off. | C08F 220/36 |
| 2665452 | 7/1990 | France | C08F 220/34 |
| 489436 | 3/1992 | Japan | C07C 15/52 |

OTHER PUBLICATIONS

Denz et al., "Volume Hologram Multiplexing Using a Deterministic Phase Encoding Method", Optics Communications 85 (1991) 171-176, North-Holland.
Collier et al., "Information Storage", Optical Holography Academic Press 1971.
Zhang et al., "Observation of Photorefractivity in a Fullerene-Doped Polymer Composite", Physical Review B vol. 46, No. 15, 15 Oct. 1992-I.
Silence et al., "Subsecond Grating Growth in a Photorefractive Polymer", Aug. 15, 1992, vol. 17, No. 16, Optics Letters.
Yeh, "Fundamental Limit of the Speed of Photorefractive Effect and Its Impact on Device Applications and Material Research", Applied Optics, vol. 26, No. 4, 15 Feb. 1987.
Moerner et al., "Photorefractivity in Dope Nonlinear Organic Polymers", SPIE, vol. 1560, Nonlinear Optical Properties of Organic Materials IV (1991).
Walsh et al., "Two-Beam Coupling Measurements of Grating Phase in a Photorefractive Polymer", J. Opt. Soc. Am. B, vol. 9, No. 9, Sep. 1992.
Walsh et al., "Picosecond Photoionization Geminate Recombination in an Organic Donor-Acceptor Complex", vol. 195, No. 4, Chemical Physics Letters, 24 Jul. 1992.
Wang, "Photoconductivity of Fullerene-Doped Polymers", Nature, vol. 356, 16 Apr. 1992.
Silence et al., "$C_{60}$ Sensitization of a Photorefractive Polymer", Appl. Phys. Lett. 61 (25), 21, Dec. 1992.

*Primary Examiner*—Loha Ben
*Assistant Examiner*—Michael A. Papalas
*Attorney, Agent, or Firm*—Robert B. Martin

[57] ABSTRACT

The present invention relates to an improved process for producing photorefractive net gain two beam coupling utilizing polymeric materials.

4 Claims, No Drawings

APPARATUS FOR PHOTOREFRACTIVE TWO BEAM COUPLING

FIELD OF THE INVENTION

The present invention relates to an improved process for photorefractive two-beam coupling and to a holographic storage device which uses such a process.

BACKGROUND OF THE INVENTION

The photorefractive effect involves light-induced charge redistribution in a nonlinear optical material to produce internal electric fields which by virtue of the optical nonlinearity, produce local changes in the index of refraction such that dynamic, erasable holograms are formed which diffract light. The photorefractive effect is achieved by exposing the material to an optical intensity pattern consisting of bright and dark regions, such as formed by interfering two coherent laser writing beams. Mobile charge generated in the material migrates under the influence of diffusion and drift processes to form internal space charge electric fields, i.e., a charge grating. Since the nonlinear material has an electro-optic effect, the electric field from the charge grating produces a grating in the optical index of refraction which causes light diffraction during readout. An important additional property of some photorefractive materials is asymmetric two beam coupling, which occurs when the pattern of index of refraction changes is spatially shifted from the original bright and dark optical intensity pattern. Asymmetric two beam coupling can be observed when two coherent beams are overlapped in the material and the optical power of the two transmitted beams is measured by art known techniques. Asymmetric two-beam coupling occurs if the optical power of one of the two beams decreases while the optical power in the other beam increases during grating formation. It is most advantageous if the beam which has increased in optical power realizes net power gain even with the photorefractive material absorption considered.

Inorganic crystals exhibiting the photorefractive effect are well known in the art as described in Gënter and Huignard, "Photorefractive Materials and Their Applications", Vol. I and II ("Topics in Applied Physics" Vols. 61 and 62) (Springer, Berlin, Heidelberg 1988). Inorganic photorefractive crystals have been fabricated into optical articles for the transmission and control (change phase, intensity, or direction of propagation) of electromagnetic radiation. Several inorganic crystals exhibit net gain in two beam coupling such as $BaTiO_3$, $Bi_{12}SiO_{20}$, and $Sr_xBa_{1-x}Nb_2O_6$ as summarized for example by Yeh in Applied Optics, Vol. 26, p. 602, 1987. Net gain is essential to several applications such as self-phase conjugation, novelty filtering, optical limiting by beam fanning as described for example by Feinberg in Physics Today, Vol. 41, p. 46, October 1988.

However, it is technically difficult to fabricate such crystals into desired thin layered devices such as optical waveguides or multiple layer stacks. Further, it is challenging to dope crystalline materials with various different dopants to achieve desired property improvements such as increases in the speed and/or magnitude of the photorefractive effect because dopants are often excluded from the crystals during growth.

Schildkraut et al. U.S. Pat. No. 4,999,809 (issued Mar. 12, 1991) discloses polymeric materials which are described as being photorefractive, Ducharme et al., U.S. Pat. No. 5,064,264 (issued Nov. 12, 1991) discloses certain polymeric materials which are shown to be photorefractive. These polymeric materials can be fabricated into thin layered devices such as optical waveguides or multilayer stacks. Further, they can be readily doped with organic materials to improve the photorefractive effect. Generally, an external electric field is required in order to assist in the charge redistribution process. As a result of the applied field, a nonzero phase shift can occur between the index of refraction grating and the optical light pattern. At sufficiently high applied electric field, polymeric photorefractive materials have been shown to exhibit asymmetric two-beam coupling as described by Walsh and Moerner in the Journal of the Optical Society of America B: Optical Physics, Vol. 9, p. 1642 (1992), the disclosure of which is incorporated herein by reference. However, there has been no disclosure of net gain in photorefractive two-beam coupling for polymeric photorefractive materials. There still is a need in the art for a process for net two-beam coupling gain with polymeric photorefractive materials.

It is therefore an object of the present invention to provide an improved process for photorefractive two-beam coupling resulting in net gain. Other objects and advantages will be apparent from the following disclosure.

SUMMARY OF THE INVENTION

The present invention relates to a process for producing net gain in photorefractive two beam coupling comprising exposing a polymeric optical article to an external electric field and to two intersecting beams of coherent electromagnetic radiation. The optical article comprises three components: (i) at least 50% by weight of a charge transporting polymer having an absorption coefficient at the wavelength of the incident radiation of less than 0.1 $cm^{-1}$; (ii) a non-linear optical chromophore which when oriented by the external electric field imparts to the optical article at the wavelength of incident radiation sufficient optical nonlinearity to provide a change in the optical index of refraction per unit electric field of greater than 0.1 picometer per Volt (pm/V) and (iii) a sensitizer. The sensitizer absorbs preferably at least about 80% of total radiation which is absorbed by the optical article. Preferably the total optical absorption by the article is less than 10 $cm^{-1}$. Preferably the wavelength of incident radiation is greater than 650 nm and more preferably greater than 700 nm.

A more thorough disclosure of the present invention is presented in the detailed description which follows.

DETAILED DESCRIPTION OF THE INVENTION

The present invention relates to a process for producing net gain in photorefractive two beam coupling. As used herein, net gain in photorefractive two beam coupling shall mean an increase in the optical power of one of two intersecting coherent light beams transmitted through and intersecting in a photorefractive optical article where the increase in optical power is greater than the optical loss due to absorption by the optical article. Net gain in photorefractive two-beam coupling can be expressed as follows:

$$\Gamma - \alpha > 0$$

where $\Gamma$ is the two-beam coupling gain coefficient in inverse length units and $\alpha$ is the optical loss coefficient in the same inverse length units, for example, $cm^{-1}$. Preferably, net gain is greater than 1 $cm^{-1}$.

In the process of the present invention, two coherent light beams of the same polarization preferably having the same wavelength are overlapped in a photorefractive optical article. Preferred sources of coherent light beams are lasers and other light sources with high coherence. Preferred lasers are krypton ion, argon ion, titanium sapphire, dye, diode, and neodymium doped-yttrium aluminum garnet lasers. Preferably, the light has a wavelength greater than about 650 nm, more preferably greater than about 700 nm and most preferably greater than about 750 nm. The two incident beams are focused so that they intersect within the interior bulk of the optical article. The light beams have the same polarization and sufficient spatial and temporal coherence so that a pattern of bright and dark light fringes is produced in the bulk of the article. Preferably, this light pattern is stationary as is the case when both beams have the same wavelength. In the case that the beams have slightly different wavelengths, the bright and dark fringe pattern moves slowly enough so that charge redistribution can still occur.

The photorefractive optical article can be freestanding or alternatively can be disposed in a waveguide, fiber, thin rod, or a multiple layered article consisting of a stack with multiple photorefractive polymer layers alternated with inert transparent layers. The optical article contains means by which an external electric field can be applied to the material to provide for poling orientation of the NLO chromophore and for efficient charge generation and redistribution in the presence of the intersecting light beams. The methods for making such optical articles, overlapping the coherent laser beams in the article, and applying external electric fields are disclosed in Günter and Huignard (ref. above) Feinberg (ref. above) and Walsh and Moerner (ref. above) which are each incorporated herein by reference. The photorefractive optical article for use in the process of the present invention comprises a charge transporting polymer, a nonlinear optical chromophore and a sensitizer.

The first component of the optical article is the charge transporting polymer. The article comprises at least about 50% by weight of the charge transporting polymer, preferably at least about 60% by weight, and more preferably at least about 70% by weight of the polymer. The polymer will generally have a molecular weight Mn of about 1,000 to $10^7$. The polymer preferably is substantially amorphous to avoid scattering of incident light beams. Further, the charge transporting polymer has a low absorption coefficient at the wavelength(s) of the incident radiation of less than about 0.1 $cm^{-1}$ preferably less than about 0.01 $cm^{-1}$. The polymer functions to transport migrating charge to create space charge fields within the article thereby creating refractive index variations due to the optical nonlinearity. Preferably, the polymer has a glass transition temperature near or above the process operation temperature to enable free rotational orientation of the NLO chromophores during the poling process. Suitable charge transporting polymers for use in the process of the present invention include poly(vinyl carbazole), poly(silanes), poly(para-phenylene vinylene), poly(aniline), and other charge transporting polymers as known in the art.

The second component of the optical article for use in the process of the present invention is a nonlinear optical chromophore (NLO chromophore). The organic molecule serving as the NLO chromophore has unsymmetrical, polarized, conjugated $\sigma$ or $\pi$ electrons between an electron donor group and an electron acceptor group. The NLO chromophore has an electric dipole moment in the ground electronic state. When oriented under the influence of the applied external electric field, the NLO chromophores for use in the process of the present invention impart to the optical article a high nonlinear optical response, i.e., a change in the optical index of refraction per unit applied field of greater than 0.1 pm/V at the wavelength of the incident radiation. NLO chromophores can be substituted with solubilizing groups such as alkyl or perfluoroalkyl or alkoxy which are not significantly detrimental to the nonlinearity and which may impart other useful properties such as solubility and miscibility with the host polymer. Preferably, the NLO chromophores are dispersed in the charge transporting polymer. However, in some cases, the NLO chromophore can be optionally covalently bonded to the charge transporting polymer. Preferred NLO chromophores for use in the process of the present invention are 1. (+)-2-($\alpha$-methylbenzyl)amino-5-nitropyridine (MBANP)
2. 4-piperidinobenzylidenemalononitrile (PDCS)
3. 2-trifluoromethyl-4-nitro-4'-methoxystilbene (MTFNS)
4. 1,3-dimethyl-2,2-tetramethylene-5-nitrobenzimidazoline (NEEDLE), and
5. a substituted styrene having the general structure

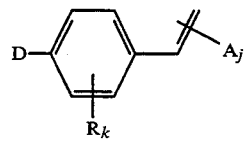

wherein D is an electron donating group such as alkoxy, aryloxy, thioalkyl, thioaryl, amino, alkylamino, arylamino which is located preferably in the para position;

wherein $A_j$ is one or more of the electron withdrawing groups such as (i) nitro, cyano, sulfonyl, carbonyl, alkoxycarbonyl and which number $j = 1$, 2 or 3 and are attached to the styrene at the $\beta_{trans}$, $\beta_{cis}$ or $\alpha$ positions and (ii) the electron withdrawing groups such as nitrovinyl, dicyanovinyl tricyanovinyl and nitrophenyl attached to the $\beta_{trans}$ position;

and wherein $R_k$ is a substituent on the aromatic ring such as halo, alkyl, perfluoroalkyl and alkoxy which influences the transparency, nonlinearity and solubility of the chromophore.

For the PVK host polymer, the preferred styrene NLO chromophore is trans-3-fluoro-4-N,N-diethylamino-$\beta$-nitrostyrene (FDEANST). For the poly(silane) host polymer, the preferred styrene NLO chromophore is 3-fluoro-4-N,N-diethyl-$\beta$-methyl-$\beta$-nitrostyrene (F-DEAMNST).

The optical article also comprises a sensitizer. To increase the efficiency of the process of the present invention, the sensitizer absorbs at least about 70% of total radiation which is absorbed by the optical article preferably at least about 80%. The absorption by the sensitizer can be determined by measuring absorption of the article with and without the sensitizer. Preferably the total optical absorption by the article is less than 10 cm$^{-1}$. The sensitizer in some cases can form a complex such as with the charge transporting polymer or with the NLO chromophore. In the case that the sensitizer forms a complex, the complex should absorb at least about 70% of total radiation which is absorbed by the optical article preferably at least about 80%. Suitable sensitizers for use in the process of the present invention include tri-nitrofluorenone (TNF), fullerenes such as $C_{60}$ and $C70$, perylene dyes such as perylene dicarboxyimide, squaryllium dyes, charge transfer complexes such as anthracene/tetracyanoquinodimethane, and molecules with oxidation potential greater than carbazole and with optical absorption preferably in the wavelength region greater than 650 nm. Other sensitizing agents will be known in the art such as those disclosed in U.S. Pat. No. 5,064,264, the disclosure of which is incorporated herein by reference. The sensitizer or a charge transfer complex formed by the sensitizer absorbs the incident light and generates the mobile charge. Preferably, the quantum yield of mobile charge generation, which is the number of mobile charges generated per sensitizer molecule per photon absorbed, is greater than 1 percent, more preferably greater than 10 percent, and most preferably greater than 90 percent. Generally, the article comprises about 0.01 weight % to about 10 weight % of the sensitizer, preferably less than 1.5 weight %. Because the sensitizer comprises such a small portion of the article, there is minimum absorption of incident light by the article and the total absorption of light by the optical article preferably is less than 10 cm$^{-1}$.

The internal space charge field formed in the charge transporting polymer depends upon trapped electrons or holes for its source. In many polymeric materials, the trapping sites are accidental, due to defects and impurities in the amorphous polymer matrix. Space charge trapping can be enhanced if desired, by the deliberate incorporation of trapping species into the optical article. When the charge transport agent is an electron donor, transporting holes, trap sites can be provided by the incorporation of a second donor of lower oxidation potential as disclosed for example in Ducharme et al. When the charge transport agent is an electron acceptor, transporting electrons, trap sites can be provided by the incorporation of a second acceptor of greater electron affinity.

The process of the present invention can be utilized in a variety of applications such as optical phase conjugation, optical beam deflection, optical interconnection, coherent optical amplification, novelty filtering, and the like. The process of the present invention is particularly useful in coherent light amplification, optical limiting, beam fanning and self-phase conjugation.

The present invention also relates to a process for holographic storage and a holographic storage device. The process for holographic storage of the present invention generally involves exposing a photorefractive optical article to an external electric field and to two intersecting beams of coherent light having the same polarization and a wavelength greater than 700 nm. One of the two beams is a non-information-bearing reference beam, preferably a collimated or weakly focused beam with nearly planar phase fronts. The second beam is the information-bearing signal beam, which in general has a complicated phase front and has a complicated transverse intensity distribution. Information in the form of parallel blocks of data is impressed on the signal beam by passing it through a mask or page composer that modulates its transverse phase or intensity profile. The photorefractive optical article records the hologram as a complicated three dimensional spatial pattern of index of refraction variation, which is mathematically equivalent to the Fourier superposition of a multiplicity of sinusoidal index gratings, each with a distinct amplitude, spatial frequency, and spatial phase. After an appropriate strength of the overall index of refraction variation is reached, the reference and signal beams are shut off.

The information recorded in the hologram can be read out by illuminating the photorefractive optical article with a duplicate of the original reference beam. The index of refraction variations produced by the writing process diffract light from the readout beam to form a reconstruction of the original information bearing signal beam which originates within the photorefractive optical article and propagates through free space beyond the article. The holographically recorded data is then recovered by using standard optical elements to capture the reconstructed beam and form a real image of the plane of the page composer on a high resolution detector array.

When the photorefractive article is thick compared to the inverse of the dominant spatial frequency component of the recorded hologram, multiple holograms can be multiplexed in the same spot on the photorefractive article by varying the angle of incidence of the reference beam, so that each hologram is produced by a separate angle of intersection of reference and signal beams during the writing process. Selected holograms are then read out by illuminating the same spot on the photorefractive article with readout beams that duplicate the particular reference beam used in the recording process, including the same angle of incidence. (As described by D. L. Staebler, et al., Appl. Phys. lett. 26, (1975) 182.) Alternatively, multiplexing can be achieved by encoding the phase fronts of each reference beam (as described by C. Denz, et al., Optics Communications 85, (1991), pg 171-176) or by varying the laser wavelength used to form the reference, signal, and readout beams.

The present invention also relates to a holographic storage device comprising:

1) a photorefractive polymeric optical article comprising at least 50% by weight of a charge transporting polymer having an absorption coefficient at wavelengths greater than 700 nm of less than 0.1 cm$^{-1}$, a nonlinear chromophore which when oriented by an external electric field provides the article with a change in the index of refraction per unit applied field of greater than 0.1 pm/V, and a sensitizer, which provides at least about 70% of the total absorption of radiation by the optical article at wavelengths greater than 700 nm;

2) means for forming and intersecting two beams of coherent electromagnetic radiation of the same polarization (the reference and signal beams) in the article where the beams have a wavelength greater than 700 nm;

3) means for applying an external electric field, and 4) means for impressing spatial information on the signal beam.

Preferably, the device is provided with means for controlling the reference beam's phase or angle. The operational parameters for holographic process storage and components for holographic storage devices are well known in the art for crystalline photorefractive materials such as disclosed in Collier et al., Optical Holography, Chapter 16, Academic Press (1991), the disclosure of which is incorporated herein by reference.

The following examples are detailed descriptions of the process of the present invention. The detailed preparations fall within the scope of, and serve to exemplify, the more generally described methods set forth above. The examples are presented for illustrative purposes only, and are not intended as a restriction on the scope of the invention.

EXAMPLE 1—Synthesis

(4-n-Butoxyphenyl)ethyldichlorosilane

Mg shavings (15.9 g, 0.66 mol) were placed in an oven-dried, argon-filled 2 L 3-neck flask equipped with thermometer, condenser, addition funnel and argon inlet. 180 mL dry THF (Na/Ph$_2$CO) was added and the magnesium was stirred for about 20 minutes with several drops of 1,2-dibromoethane. Para-n-butoxyphenylbromide (previously distilled off CaH$_2$) (100 g, 0.44 mol) was dissolved in 340 mL THF and added dropwise to the magnesium. After some initial heating with a heatgun, the solution refluxed gently during the 1 h addition. The solution was heated to reflux for an additional 4 h, then cooled to room temperature and filtered through a glass wool plug into an addition funnel. The addition funnel was fitted onto a 2 L flask fitted with a condenser and mechanical stirrer and charged with 200 mL Et$_2$O (new can) and EtSiCl$_3$ (previously distilled off CaH$_2$) (72 g, 0.44 mol). The Grignard solution was added dropwise with stirring, first at 0° C., then at ambient temperature, over about 15 hours. The resulting white mixture was stirred for an additional hour. The mixture was filtered through a pad of oven-dried Celite and washed with 300 mL Et$_2$O. The brown flitrate was concentrated on a rotary evaporator. The residue was washed with 500 mL hexane and the precipitate removed by filtration through a second Celite pad. The hexane was removed on a rotary evaporator, and the residue was Kugelrohr distilled (110–130° C./<10 μm Hg). The distillate was redistilled off CaH$_2$ through a short-path distillation apparatus (95° C./15–ηm Hg). Yield: 52 g (43%).

Polymerization of (4-n-Butoxyphenyl)ethyldichlorosilane

Sodium spheres (4 g, 0.17 m) were dispersed in 50 mL refluxing dry toluene. 25 mL additional toluene was then added. (4-n-Butoxphenyl)ethyldichlorosilane (21.75 g, 0.078 mol) was dissolved in 20 mL toluene and added dropwise via syringe pump at 0.7 mL/min to the sodium dispersion as it was stirred at 65–74° C. with a Teflon stirrer. After the 50 min addition, the reaction mixture was stirred for an additional 2 h. In succession, 40 mL toluene, 5 mL isopropanol and 70 mL toluene were added. The solid was removed by filtration through a "C" frit. The tiltrate was washed with 3×100 mL H$_2$O and dried over MgSO$_4$. 100 mL MeOH were added to the tiltrate. The resulting precipitate was dried in a vacuum oven for 3 days (2 g, 12%). 1 g of the white solid was dissolved in 100 mL toluene with stirring overnight, then added dropwise to 150 mL isopropanol. The gooey solid precipitate was collected and dried in a vacuum oven to yield 0.5 g.

M$_2$(GPC)=473,000(PDI=2.6)T$_g$(DSC)~56° C.
TGA: 99.5% intact at 300° C.; 80.5% remaining at 398° C. UV:λ$_{max}$(thin film)350 nm.

4-piperidinobenzylidenemalononitrile (PDCS)

This compound was prepared by the method of Brunskill, et. al., Synthetic Communications, 8 (1)1–7 (1978); and had mp 125–126°, [lit[1] mp 126–127°]: $^1$H NMR (CDCl$_3$)δ1.60–1.80 (brs, 6H), 3.40–3.60 (m, 4H), 6.83 (d, J=9, 2H), 7.41 (s, 1H), 7.77 (d, J=9, 2H); $^{13}$C NMR (CDCl$_3$) ppm 24.311, 25.421, 48.037, 71.990, 112.969, 114.933, 116.032, 119.670, 134.022, 154.435, 157.775.

3-fluoro-4-diethylaminobenzenecarboxaldehyde

In a 250 mL round bottom flask equipped with stirbar, condenser and nitrogen inlet was placed 3,4-difluorobenzaldehyde (25.0 g, 176 mmol), dimethylsulfoxide (50 mL) and diethylamine (38.6 g, 528 mmol). The resulting solution was boiled gently for 6 hr at which time thin layer chromatography indicated all the difluorobenzaldehyde was consumed. The solution was cooled and transferred to a separatory funnel with ethyl acetate and water. The phases were separated, the organic phase washed well with water, dried (MgSO$_4$) and filtered through a short pad of silica gel. Silica gel (50 g) was added to the filtrate and the mixture concentrated to dryness. This material was placed at the top of a column of silica gel and eluded with a gradient of ethylacetate in hexane (0→4%). Concentration of the pure fractions by rotary evaporation afforded a light brown oil (31.97 g, 92%) of sufficient purity for subsequent transformations: IR (CCl$_4$)1695 cm$^{-1}$; $^1$H NMR (CDCl$_3$)δ9.70 (s, 1H), 7.41–7.50 (m, 2H), 6.78 (t, J=8Hz, 1H), 3.39 (q, J=7 Hz, 4H), 1.20 (t, J=7 Hz, 6H); $^{13}$C NMR (CDCl$_3$) ppm 189.048, 151.901 (d, J=244 Hz), 142.844 (d, J=8 Hz), 127.880. 126.244 (d, 6 Hz), 116.433 (d, J=23Hz), 115.316 (d, 5 Hz), 45.845 (d, J=6Hz), 12.858 d,J=1 Hz).

3-fluoro-4-N,N-diethylamino-β-nitrostyrene (FDEANST)

In a 500 mL round bottom flask equipped with stirbar and nitrogen inlet was placed 3-fluoro-4-diethylaminobenzaldehyde (9.76 g, 50 mmol), nitromethane (6.5 g, 100 mmol), methanol (50 mL) and ethylenediamine diacetic acid salt (0.90 g, 5.0 mmol). The resulting solution was stirred at room temperature for 36 hr and then chilled in an ice bath and the crystalline product isolated by suction filtration, washed well with cold methanol and air dried. The red crystals were further purified by one more crystallization from methanol, (6.46 g, 54%): mp 73.3–74.0°; $^1$H NMR (CDCl$_3$) δ7.90 (d, J=14 Hz, 1H), 7.46 (d, J=14 Hz), 7.22–7.13 (m, 2H), 6.77 (t, J=9 Hz, 1H),3.40(q,J=7 Hz, 4H), 1.21 (t, J=7 Hz, 6H); $^{13}$C NMR (CDCl$_3$) ppm 152.186 (d, J=244Hz), 141.360 (d, J=8 Hz), 138.739 (d, J=2 Hz), 133.452, 127.320, 118.848 (d, J=8 Hz), 116.735 (d, J=19Hz), 116.513, 45.998 (d, J=5 Hz), 13.04. Anal. Calcd for C$_{12}$H$_{15}$FN$_2$O$_2$: C, 60.49; H, 6.34; N, 11.75; F, 7.97. Found: C, 60.58; H, 6.27; N, 11.97; F, 7.97. Additional product could be obtained by combination of the mother liquors and chromatography.

2-trifluoromethyl-4-nitro-4'-methoxystilbene (MTFNS)

In a 250 mL round bottom flask equipped with stirbar, reflux condenser and nitrogen inlet was placed 2-bromo-5-nitrobenzotrifluoride (5.40g, 20 mmol), 4- vinylanisole (2.95 g, 22 retool), NMP (20 mL), tris[2-(2-methoxyethoxy)ethyl]amine (TDA-1) (0.65 g, 2.0 mmol), potassium carbonate (4.2 g, 30 mmol) and palladium chloride (0.035 g, 0.20 retool). The resulting slurry was gradually warmed up to 140° and maintained at that temperature for 4 hr. The mixture was then cooled and water (200 mL) was added dropwise with stirring. The oily aqueous layer was decanted and replaced by more water (200 mL) and the resulting suspension was stirred and the black solid isolated by suction filtration, washed well with water and then air dried. The crude product was transferred to an Erlenmeyer flask containing Bentonite clay (5 g), silica gel (5 g) and methylcyclohexane (150 mL). The slurry was boiled with stirring, hot filtered and upon cooling the product was isolated from the filtrate as light yellow crystals, (3.30 g, 51%): mp 120.4–122.7°; $^1$H NMR (CDCl$_3$)$\delta$8.52 (s, 1H), 8.35 (d, J=9Hz, 1H), 7.94 (d, J=9 Hz), 7.51 (d, J=9 Hz, 2H), 7.28 (q, J=16 Hz, 2H), 6.95 (d, J=9 Hz), 3.86 (s, 3H); $^{13}$C NMR (CDCl$_3$)ppm 160.669, 145.561,143.022, 136.361,128.812, 128.438, 128.005, 127.502, 127.251,126.439, 129.315, 121.961,121.864, 120.953. 119.581, 114.318, 55.278.

(+)-2-(α-methylbenzyl)amino-5-nitropyridine (MBANP)

MBANP, a well known single crystal NLO material, was prepared by the method disclosed by Twieg et al. Poly. Prep., 23(2), 147 (1982).

1,3-dimethyl-2,2-tetramethylene-5-nitrobenzimidazoline (NEEDLE)

In a 250 mL round bottom flask was placed 3,4-bis(-methylamino)nitrobenzene (0.905 g, 5.0 mmol), ethyl acetate (125 mL), cyclopentanone (2.10 g, 25.0 mmol) and toluenesulfonic acid hydrate (25 mg). The resulting solution was boiled on a steam bath for one hour and then silica gel (10 g) was added and the slurry concentrated to dryness. This mixture was placed at the top of a silica gel column and eluded with a gradient of ethyl acetate in hexane (0→18%). Fractions containing pure product were combined and concentrated and recrystallized from a mixture of isopropyl ether and dichloromethane to give black glistening needles (1.09 g, 87%): mp 104.8–107.7; $^1$H NMR (CDCl$_3$) $\delta$7.66 (dd, J=2 Hz, 8 Hz, 1H), 6.80 (d, 2 Hz, 1H), 5.95 (d, 8 Hz, 1H), 2.88 (s, 3H), 2.81 (s, 3H), 1.90–2.05 (m, 4H), 1.66–1.89 (m, 4H); $^{13}$C NMR (CDCl$_3$) ppm 140.016, 139.997, 138.779, 118.792, 98.654, 97.471, 95.557, 34.132, 27.954, 27.811, 26.063.

3-fluoro-4-N,N-diethyl-β-methyl-β-nitrostyrene (F-DEAMNST)

In a 500 mL round bottom flask equipped with stirbar and nitrogen bubbler was placed 3-fluoro-4-N,N-diethylaminobenzaldehyde (5.868, 30 mmol), methanol (75 mL), nitroethane (4.50 g, 60 mmol) and EDDA (540 mg, 3.0 mmol). The resulting solution was stirred at room temperature for 3 days at which time only a trace of starting aldehyde remained. Silica gel (158) was added to this solution and the slurry concentrated to dryness by rotary evaporation. This mixture was placed at the top of a silica gel column and eluded with a gradient (0→4%) of ethyl acetate in hexane. Fractions containing pure product were combined and concentrated to give a yellow-orange oil (5.82 g, 76%): $^1$H NMR (CDCl$_3$)$\delta$7.97 (s, 1H), 7.06–7.16 (m, 2H), 6.78–6.88 (m, 1H), 3.31–3.46 (m, 4H), 2.46 (d, J=1 Hz, 3H), 1.18 (t, J=7 Hz, 6H); $^{13}$C NMR (CDCl$_3$) ppm 152.490 (d, J=244 Hz), 139.677 (d, J=7 Hz),133.205 (d, J=2 Hz), 127.940 (d, J=2 Hz), 121.577 (d, J=8 Hz), 118.283 (d, J=24 Hz), 117.043 (d, J=5 Hz), 45.805 (d, J=5 Hz), 14.035, 12.922. Anal. Calcd for C$_{13}$H$_{17}$FN$_2$O$_2$: C, 61.89; H, 6.79; N, 11.10; F, 7.53. Found: C, 61.38; H, 6.76; N, 11.02; F, 7.45.

Specific examples of the process of the present invention comprising different charge transporting polymer/NLO chromophore/sensitizer combinations which satisfy of the claims are as follows:

EXAMPLE 2—Process

To 0.25 ml of the solvent mixture toluene/cyclohexanone (80%/20% by volume) was added 38 mg of the hole transporting polymer PVK, (Aldrich Chemical Company, secondary standard, M$_w$=100,000, M$_n$=38,000), 19 mg of the chromophore F-DEANST, and 0.9 mg of the sensitizer TNF. The solution was deposited on two glass plates coated with 120 nm of the transparent conducting material indium tin oxide (ITO). The polymer mixture was dried under ambient conditions for 16 hours and at 50 C at a pressure of less than 30 mTorr for an additional 6 hours. The coated plates were then heated at 140 C for 2 minutes and the plates were pressed together to seal the polymer mixture between them. The .plates were held parallel by means of 125 μm Mylar spacers placed at the edges of the plates. The optical absorption coefficient of the resulting sample was measured to be 1.4 cm$^{-1}$ at 753 nm.

Photoconductivity was demonstrated by placing 500 V bias across the sample and measuring the increase in the current when the sample was irradiated with 100 mW of monochromatic 753 nm light with a spot size of 3 mm. From this the photoconductivity per unit light intensity $\sigma$/I was determined to be $1.3 \times 10^{-13} (\Omega \text{cm})^{-1}(\text{W/cm}^2)$. The electrooptic effect in the polymer was determined by means of an interferometric technique which measures the change in the index of refraction as a field is applied across the sample. The product of the index of refraction cubed and the electrooptic coefficient $\gamma_{13}$ was determined to be 0.43 pm/V at a wavelength of 830 nm with a bias field of 2000 V across the sample.

The photorefractive effect was demonstrated by means of observing the formation of an index grating and the asymmetric two-beam coupling (2BC) techniques discussed above. As is well-known in the art, the formation of the index grating can be detected by measuring the power in a beam that is generated by optical diffraction from the grating, and dividing this power by the power in the probing beam to determine a diffraction efficiency. The operating wavelength in both measurements was 753 nm. When a bias field of 4000 V was placed across the sample, a peak diffraction efficiency of $\eta=4.5\times10^{-4}$ was observed in the diffraction efficiency measurement. At the same field the 2BC was observed to be asymmetric with a gain coefficient of $\Gamma=7.0$ cm$^{-1}$. Therefore the process produced a net internal gain of 5.6 cm$^{-1}$.

EXAMPLE 3—Process

To 0.25 ml of the solvent mixture toluene/cyclohexanone (80%/20% by volume) was added 38 mg of the hole transporting polymer PVK, 19 mg of the chromophore PDCS, and 0.9 mg of the sensitizer TNF. A sample was prepared from this solution as described in Example 1. The optical absorption coefficient of the sample was measured to be 2.3 cm$^{-1}$. Under the conditions described in example 1, $\sigma/I$ was determined to be 7.6×10$^{-14}$($\Omega$cm)$^{-1}$/(W/cm$^2$) and n$^3\gamma_{13}$ was determined to be 0.23 pm/V.

The photorefractive effect was demonstrated by measurement of the diffraction efficiency from the index grating and the two-beam coupling gain coefficient. The operating wavelength in both measurements was 753 nm. When a bias field of 4000 V was placed across the sample, a peak diffraction efficiency of $\eta = 3.7 \times 10^{-3}$ was observed. At the same field the 2BC was observed to be asymmetric with a gain coefficient of $\Gamma = 7.8$ cm$^{-1}$. Therefore example had a net internal gain of 5.5cm$^{-1}$.

EXAMPLE 4—Process

To 0.25 ml of the solvent mixture toluene/cyclohexanone (80%/20% by volume) was added 38 mg of the hole transporting polymer PVK, 19 mg of the chromophore MBANP, and 0.9 mg of the sensitizer TNF. A sample was prepared from this solution as described in Example 1. The optical absorption coefficient of the sample was measured to be 0.9 cm$^-$. Under the conditions in example 1, $\sigma/I$ was determined to be 3.8×10$^{-14}$($\Omega$cm)$^{-1}$/(W/cm$^2$) and n$^3\gamma_{13}$ was determined to be 0.07 pm/V.

The photorefractive effect was demonstrated as described in Example 1. The operating wavelength in was 753 nm. When a bias field of 4000 V was placed across the sample, a peak diffraction efficiency of $\eta = 1.7 \times 10^{-4}$ was observed. At the same field the 2BC was observed to be asymmetric with a gain coefficient of $\Gamma = 2.6$ cm$^{-1}$. Therefore this example produced a net internal gain of 1.7 cm$^{-1}$.

EXAMPLE 5—Process

To 0.25 ml of the solvent mixture toluene/cyclohexanone (80%/20% by volume) was added 38 mg of the hole transporting polymer PVK, 19 mg of the chromophore MTFNS, and 0.9 mg of the sensitizer TNF. A sample was prepared from this solution as described in Example 1. The optical absorption coefficient of the sample was measured to be 0.6 cm$^{-1}$. Under the conditions described in example 1, $\sigma/I$ was determined to be 8.5×10$^{14}$($\Omega$cm)$^{-14}$/(W/cm$^2$) and n$^3\gamma_{13}$ was determined to be 0.15 pm/V.

The photorefractive effect was demonstrated by means of the methods described in Example 1 discussed above. The operating wavelength was 753 nm. When a bias field of 4000 V was placed across the sample, a peak diffraction efficiency of $\eta = 1.2 \times 10^{-5}$ was observed. At the same field the 2BC was observed to be asymmetric with a gain coefficient of $\Gamma = 1.2$ cm$^{-1}$. Therefore this example had a net internal gain of 0.6 cm$^{-1}$.

EXAMPLE 6—Process

To 0.25 ml of the solvent mixture toluene/cyclohexanone (80%/20% by volume) was added 38 mg of the hole transporting polymer PVK, 19 mg of the chromophore F-DEANST, and 0.1 mg of the sensitizer C$_{60}$. A sample was prepared from this solution as described in Example 1. The optical absorption coefficient of the sample was measured to be 0.9 cm$^{-1}$. Under the conditions described in example 1, $\sigma/I$ was determined to be 5.2×10$^{-14}$($\Omega$cm)$^{-1}$/(W/cm$^2$) and n$^3\gamma_{13}$ was determined to be 0.38 pm/V.

The process of the present invention was demonstrated using an operating wavelength of 753 nm. When a bias field of 4000 V was placed across the sample, a peak diffraction efficiency of $\eta = 1.1 \times 10^{-3}$ was observed. At the same field the 2BC was observed to be asymmetric with a gain coefficient of $\Gamma = 9.0$ cm$^-$. Therefore this example had a net internal gain of 8.1 cm$^{-1}$.

EXAMPLE 7—Process

To 0.25 ml of the solvent mixture toluene/cyclohexanone (80%/20% by volume) was added 38 mg of the hole transporting polymer PVK, 19 mg of the chromophore F-DEANST, and 0.1 mg of the sensitizer perylene-dci. A sample was prepared from this solution as described in Example 1. The optical absorption coefficient of the sample was measured to be 0.3 cm$^{-1}$. Under the conditions described in example 1, $\sigma/I$ was determined to be 8.0×10$^{-1}$/(W/cm$^2$) and n$^3\gamma_{13}$ was determined to be 0.48 pm/V.

At an operating wavelength of 753 nm, when a bias field of 4000 V was placed across the sample, a peak diffraction efficiency of $\eta = 4.0 \times 10^{-5}$ was observed. At the same field the 2BC was observed to be asymmetric with a gain coefficient of $\Gamma = 2.3$ cm$^{-1}$. Therefore this example had a net internal gain of 2.0 cm$^{-1}$.

EXAMPLE 8—Process

To 0.25 ml of the solvent mixture toluene/cyclohexanone (80%/20% by volume) was added 33 mg of the hole transporting polymer PVK, 19 mg of the chromophore NEEDLE, and 0.1 mg of the sensitizer C$_{60}$. A sample was prepared from this solution as described in Example 1. The optical absorption coefficient of the sample was measured to be 4.0 cm$^{-1}$. Under the conditions described in example 1, $\sigma/I$ was determined to be 6.1×10$^{-14}$($\Omega$cm)$^{-1}$/(W/cm$^2$) and n$^3\gamma_{13}$ was determined to be 0.24 pm/V.

The net gain process was demonstrated as described in Example 1. The operating wavelength was 753 nm. When a bias field of 4000 V was placed across the sample, a peak diffraction efficiency of $\eta = 1.5 \times 10^{-3}$ was observed. At the same field the 2BC was observed to be asymmetric with a gain coefficient of $\Gamma = 10.3$ cm$^{-1}$. Therefore this example of the process yielded a net internal gain of 6.3 cm$^{-1}$.

EXAMPLE 9—Process

To 1.0 ml of the solvent anisole (methoxybenzene) was added 42 mg of the hole transporting polymer poly(n-butoxyphenylethylsilane), 28 mg of the chromophore F-DEAMNST, and 0.14 mg of the sensitizer C$_{60}$. The solution was deposited on two glass plates coated with 120 nm of the transparent conducting material indium tin oxide (ITO). The polymer mixture was dried at 95 C at atmospheric pressure for 1 hour. The coated plates were then pressed together at 95 C to seal the polymer mixture between them. The plates were held parallel by means of 175 $\mu$m glass spacers placed at the edges of the plates. The optical absorption coefficient of the resulting sample was measured to be 0.2 cm$^{-1}$ at 753 nm.

The photorefractive effect was demonstrated by means of the methods described above at an operating wavelength of 753 nm. When a bias field of 2000 V was placed across the sample, a peak diffraction efficiency of $\eta = 1.6 \times 10^{-4}$ was observed. At the same field the 2BC was observed to be asymmetric with a gain coefficient of $\Gamma = 1.6$ cm$^{-1}$. Therefore this example had a net internal gain of 1.4 cm$^{-1}$.

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

We claim:

1. A holographic storage device comprising:
   a. a photographic polymeric optical article having a change in index of refraction per unit of applied external electric field of greater than 0.1 pm/V and comprising at least 50% by weight of a charge transporting polymer having an absorption coefficient at wavelengths greater than 700 nm of less than 0.1 cm$^{-1}$, a nonlinear chromophore and a sensitizer, which provides at least about 70% of the total absorption of radiation by the optical article at wavelengths greater than 700 nm;
   b. means for forming two intersecting beams of coherent electromagnetic radiation having wavelengths greater than 700 nm in the article;
   c. means for applying an external electric field to the article; and
   d. means for impressing spatial information on one of the beams.

2. The device of claim 1 further comprising means for controlling the phase of the beams.

3. The device of claim 1 further comprising means for controlling the angle of the beams.

4. The device of claim 1 wherein said nonlinear chromophore is 2-($\alpha$-methylbenzyl)amino-5-nitropyridine, 3-fluoro-4-N,N-diethylamino-$\beta$-nitrosytrene or 2-trifluoromethyl-4-nitro-4'-methoxystibene.

* * * * *